United States Patent [19]

McVey

[11] 4,360,870

[45] Nov. 23, 1982

[54] PROGRAMMABLE I/O DEVICE IDENTIFICATION

[75] Inventor: James M. McVey, Leander, Tex.

[73] Assignee: International Business Machines Corporation, Armonk, N.Y.

[21] Appl. No.: 173,585

[22] Filed: Jul. 30, 1980

[51] Int. Cl.[3] .......... G06F 9/06

[52] U.S. Cl. .......... 364/200

[58] Field of Search ... 364/200 MS File, 900 MS File

[56] References Cited

U.S. PATENT DOCUMENTS

| | | | |
|---|---|---|---|
| 3,680,052 | 7/1972 | Arulpragasam et al. | 364/200 |
| 3,828,325 | 8/1974 | Stafford et al. | 364/200 |
| 3,909,790 | 9/1975 | Shapiro et al. | 364/200 |
| 4,079,452 | 3/1978 | Larson et al. | 364/900 |

OTHER PUBLICATIONS

*IBM Technical Disclosure Bulletin* vol. 22, No. 3, Aug. 1979, "Programmable Identification for I/O Devices", J. M. McVey, pp. 882 and 883.

*Primary Examiner*—Harvey E. Springborn

*Attorney, Agent, or Firm*—Andrea P. Bryant; John L. Jackson

[57] ABSTRACT

A computer system having a CPU connected to I/O devices via a channel sets addresses into the I/O devices by the CPU. The I/O devices, for purposes of control, are grouped in types. To load device addresses or identifiers, the processor sends a type identifier to the I/O devices. The device having the highest ordered priority of the same type of device and which does not have an assigned identifier responds by inhibiting all lower ordered devices of its type. It is then loaded with its unique assigned identifier which results in the setting of a status latch therein. This setting allows the next lowest ordered device of the same type of devices to then be assigned and loaded with an identifier by the processor. This process continues until all I/O devices of the same type are loaded with identifiers. The process is then repeated for each other type of I/O devices in the system.

18 Claims, 4 Drawing Figures

PROGRAMMABLE I/O DEVICE IDENTIFICATION

DESCRIPTION

CROSS-REFERENCE TO RELATED APPLICATION

The subject matter of this application is similar to that of U.S. patent application Ser. No. 173,586 entitled "Dynamic Device Address Assignment Mechanism for a Data Processing System", filed in the names of D. R. Chisholm and H. L. Kurtz on the same day and assigned to the same assignee as the instant application. This copending, commonly assigned, Chisholm et al. application discloses another technique of achieving the end result accomplished by the instant invention.

BACKGROUND OF THE INVENTION

This invention relates to a computer system in which a central processing unit (CPU) assigns identifiers or addresses to Input/Output (I/O) devices in the system. More particularly, the CPU designates a first type of I/O device and assigns all of the I/O devices of that type an identifier and then identifies subsequent types of I/O devices and makes the address assignment on a per type basis.

DESCRIPTION OF THE PRIOR ART

Data processing and word processing systems share common functional capabilities. A CPU or other processor controls the operation of the system. Memory capability is provided within the processor or on magnetic media. Many I/O devices may be employed in such systems. Some of these devices are magnetic card readers/recorders, magnetic flexible disk units, printers, keyboards, displays. The above may be considered broad categories or types of devices. Often times several devices of a single type are provided in a given system. In order to facilitate communication between the processor and the particular device each I/O device must have a particular address designation within the system. Typically in the prior art this address designation is hardwired within the device. While this address designation may be altered, it is inconvenient since it requires manual intervention with the system to, for example, in the case of dual inline packaged (DIP), switches to reset them to a different ID. Other types of plug connections or jumper connections are also provided in known systems. All share the same disadvantage of requiring manual intervention when particular devices are removed from the system or additional devices are added. In all of these variations of hardwiring device IDs by definition device addresses cannot be dynamically altered during the operation of the system. It is desirable, however, to have this flexibility in a system. Certain diagnostic procedures would be facilitated, and the amount of program code needed in the processor to deal with device addresses could be decreased.

DESCRIPTION OF THE PRIOR ART

A description of the present invention appears in the *IBM Technical Disclosure Bulletin,* Vol. 22, No. 3, pages 882 and 883, August 1979.

Related known patent art for reconfiguring or configuring by data processing system follows.

U.S. Pat. No. 3,680,052 to Arulpragasam et al. uses processor control to reconfigure a data processing system by interconnecting devices to different processors or memory means. It does not, however, change the I/O device identifier and system initialization time.

U.S. Pat. No. 3,828,325 to Stafford et al. teaches configuring a multiprocessor system into a variety of configurations by broadcasting a single programmed instruction. It allows various I/O ports to be enabled or disabled under processor control. The actual function of the port is defined by the processor; however, this reference does not disclose changing the actual I/O device identifier.

In general many techniques have been employed architecturally in connecting I/O devices to processors in a manner such that programming flexibility is provided. A common way of providing identification of the I/O devices in a processor system to a processor is to wire in an identifier in each of the I/O units. The wiring in of the identifiers in the processor is not only cumbersome in that quite often it requires the use of jumper cables and associated dedicated pins which can be quite costly in LSI type circuitry, but additionally, such an arrangement does not provide a high degree of flexibility in the assignment and reassignment of device addresses. Manual intervention prevents any practical fast error free reconfiguration of such a system.

Another technique which is employed for selecting I/Os by a processor is to provide a dedicated line on the address bus which is used to bring up an I/O device when the processor wishes to communicate with it. This type of configuration, again, is quite inflexible as far as permitting the reconfiguration of the system. Not only is it cumbersome to reconfigure the system in terms of the actual replacement of devices of one type by devices of another, but in addition, the programming associated with such a fixed or dedicated wire system requires that very few changes be made as a practical, economic matter.

SUMMARY OF THE INVENTION

It is an object of the present invention to overcome the disadvantages associated with the prior art techniques for handling I/O device identification assignment at system initialization time in information handling systems.

It is an object of this invention to provide a processor with means for rapidly assigning and changing I/O device identifiers.

It is still a further object to cause I/O device identifer assignment to occur in a manner which allows great flexibility in system configuration as far as placement of I/O devices within the system is concerned, as well as internal programming of the system itself.

These and other objects are accomplished in a computer system including a CPU or processor connected to various peripheral I/O devices via a channel over which device addresses are set into the I/O devices by the CPU. The I/O devices, for purposes of control, are grouped in types. To load device addresses or identifiers, the processor sends a type identifier to the I/O devices. The highest ordered device, in terms of priority, which does not have an assigned identifier responds by inhibiting all lower ordered devices of its type. It is then loaded with its unique assigned identifier which results in the setting of its status latch. This setting allows the next lowest ordered device to then be assigned and loaded with an identifier by the processor. This process continues until all I/O devices of the same type are loaded. The process is then repeated for each other type of I/O devices.

BRIEF DESCRIPTION OF THE DRAWINGS

The above summary will become more clear from a detailed description when in connection with the accompanying drawings wherein.

DESCRIPTION OF THE PREFERRED EMBODIMENT

Figure 1:
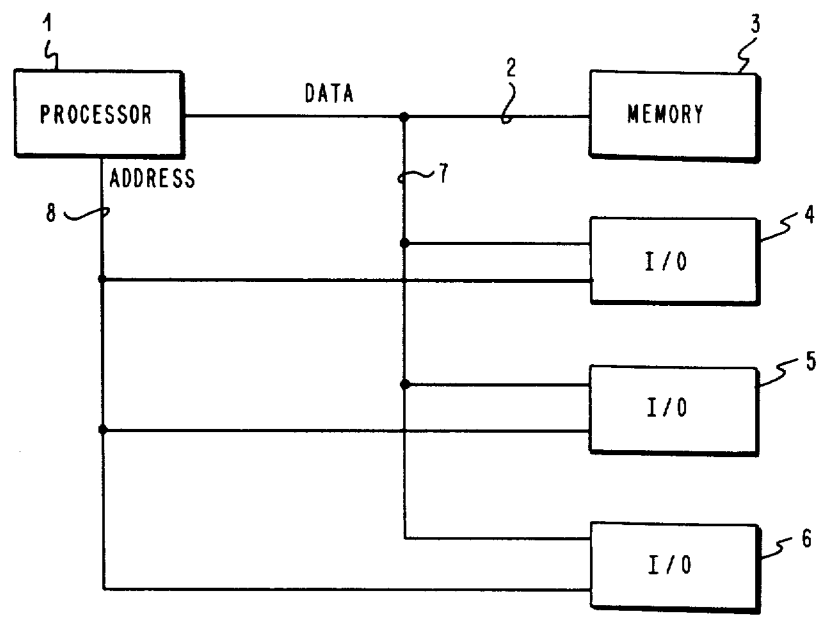
FIG. 1 is a block diagram illustrating one prior art approach to the control of I/O devices in a processing system.

Refer first to FIG. 1. In the prior art a processor 1 is connected along a data channel 2 to a memory 3 with the data channel continuing along line 7 to I/O devices 4, 5, and 6. Each of these I/O devices can be energized or addressed along address lines 8. There would be one address line for each of the I/O devices in the system. The address line associated with the I/O device requiring service would be energized by the processor. As discussed above, this type of technique is quite inflexible in terms of allowing changes in programming or system configuration.

Figure 2:
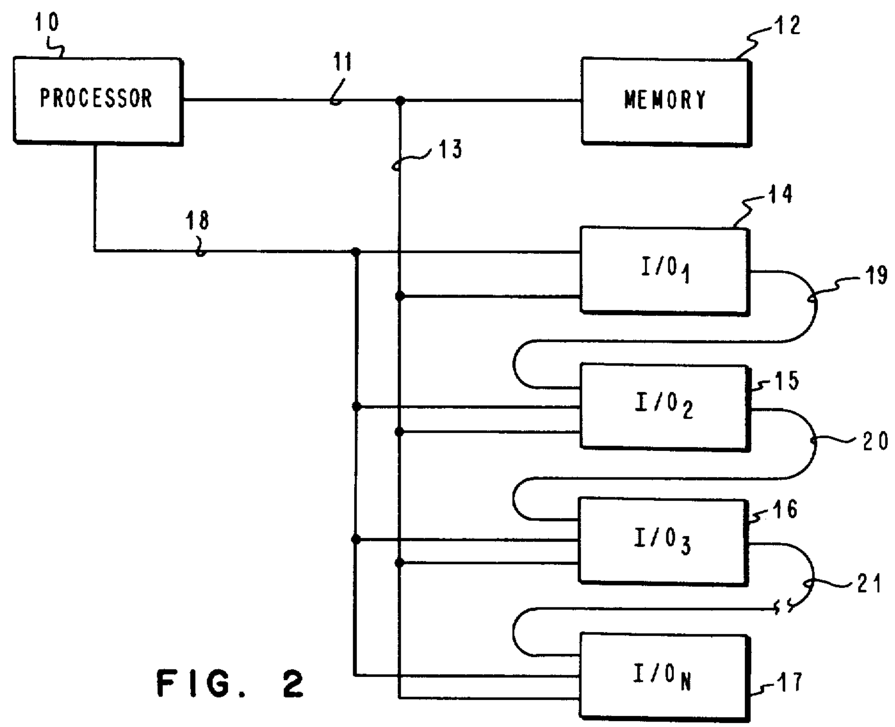
FIG. 2 is a block diagram illustrating generically the assignment of identifiers to I/O devices in accordance with the present invention.

In FIG. 2 there is shown in general detail the architecture of the subject system. Processor 10 is connected along data bus or channel 11 to a memory 12. The data also passes along bus 13 to each of I/O devices 14, 15, 16, and 17. Address lines 18 also proceed from processor 10 to each of I/O devices 14, 15, 16, and 17. As further shown in FIG. 2 the I/O devices are connected in a daisy chain or serial manner. Thus, devices 14 and 15 are connected by serial line 19; devices 15 and 16 are connected by serial line 20, etc. These connecting lines 19, 20, and 21 are used to convey status information between I/O devices as will become clear below. In general operation the processor, memory, and I/O devices in FIG. 2 operate in a conventional manner. FIG. 2 does, however, illustrate the generic concept of the present invention in which the processor 10 sends along line 13 an identifier to each of the devices 14–17. It is assumed that all of the I/O devices $I/O_1$ through $I/O_n$ are of the same type for purposes of simplicity. Processor 10 first places a TYPE command along address bus 18 into I/O devices 14–17. Once I/O device 14, labelled $I/O_1$ is loaded, with its identifier, processor 10 outputs the next identifier along line 13. Device $I/O_1$, having been loaded, so indicated to the next device $I/O_2$, as illustrated, by placing its appropriate status on line 19. This process is repeated for subsequent I/O devices until all are loaded with their respective identifiers.

Figure 3:
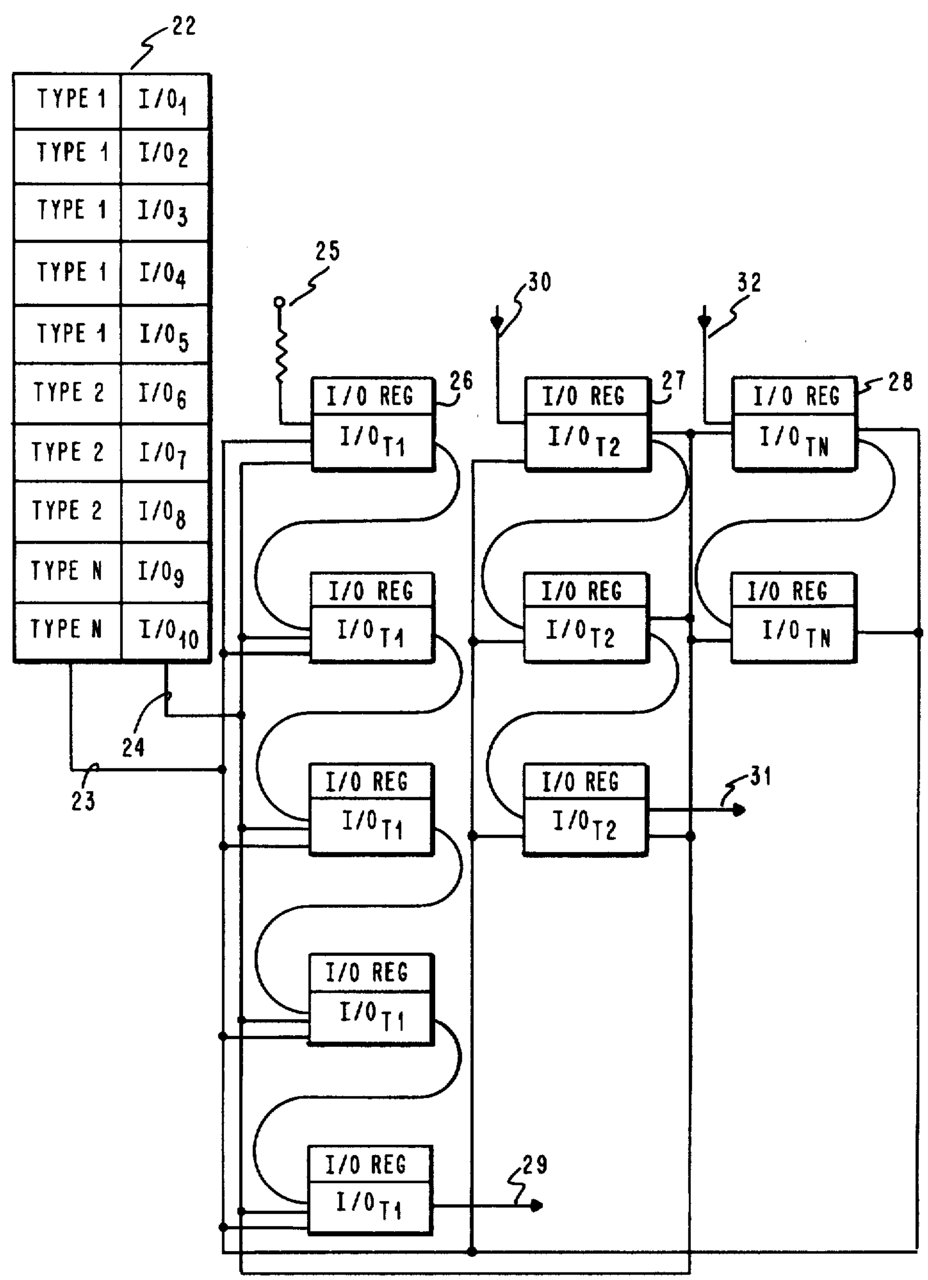
FIG. 3 is a block diagram illustrating in more detail a table method of assigning identifiers to I/O devices in a processor system.

Referring next to FIG. 3, there is illustrated a loading arrangement utilizing a table which may be implemented in the subject invention. While a table is illustrated for loading the I/O devices it will, of course, be obvious to those skilled in the art that other alternative techniques may be employed to assign addresses to the I/O devices in accordance with the present invention. In FIG. 3, table 22 includes device Type as argument and the associated device identifiers as functions. Simply as an aid to understanding the table is illustrated with argument Types in the left-hand column and I/O device identifiers in the right-hand column. I/O device identifiers are shown as $I/O_1 \ldots I/O_{10}$. During device identifier assignment, table 22 is accessed sequentially by the processor.

For example, three sets of devices are shown in FIG. 3. These three sets total 10 devices which may be in a given system. Indicated generally at 26 are devices of Type 1; at 27, devices of Type 2; and at 28, devices of Type 3. Table 22 data is conveyed to the I/O devices over address lines 23 and data bus 24. Resistor 25 is provided to enable the first device in Type 1 chain 26 to accept an identifier. This is functionally equivalent to status line 19 in FIG. 2. Arrowhead 29 connects to arrowhead 30 to illustrate how status information is conveyed between types of devices. In a similar manner arrowhead 31 connects to arrowhead 32 for the same purpose.

In accordance with the present invention, processor 10, as shown in FIG. 2, reads the first entry from table 22 and outputs the Type 1 identifier on the address lines to all of the I/O devices. Only those devices which are in fact Type 1 can accept an identifier. It will be recalled that the devices generally designated at 26 are Type 1 devices. Following the Type designation processor 10 outputs the first I/O device identifier entry from the right-hand column of table 25 over data bus 24. The first I/O device in the Type 1 chain is loaded with the I/O device identifier $I/O_1$. This number, for purposes of illustration, is loaded into the I/O register, I/O REG, portion of that I/O device. The next I/O identifier, $I/O_2$, output from table 22 by the processor is sent to all devices but is loaded only into the I/O REG portion of the second I/O device of Type 1 since it was enabled by the first I/O device. That is, the first I/O device load indicates its loaded status to the next device in the chain. This loading process continues until the I/O REG portions of all five devices, as illustrated, of Type 1 are loaded with device identifiers $I/O_1$–$I/O_5$.

The Type 2 indicator is read by processor 10 from table 22 and output along address lines. The devices indicated at 27 then can accept an identifier and are sequentially loaded in the manner described in connection with devices of Type 1. Finally, a Type n is output along address lines 23 and the devices shown generally at 28 can accept an identifier and are loaded with identifiers $I/O_9$ and $I/O_{10}$.

Figure 4:
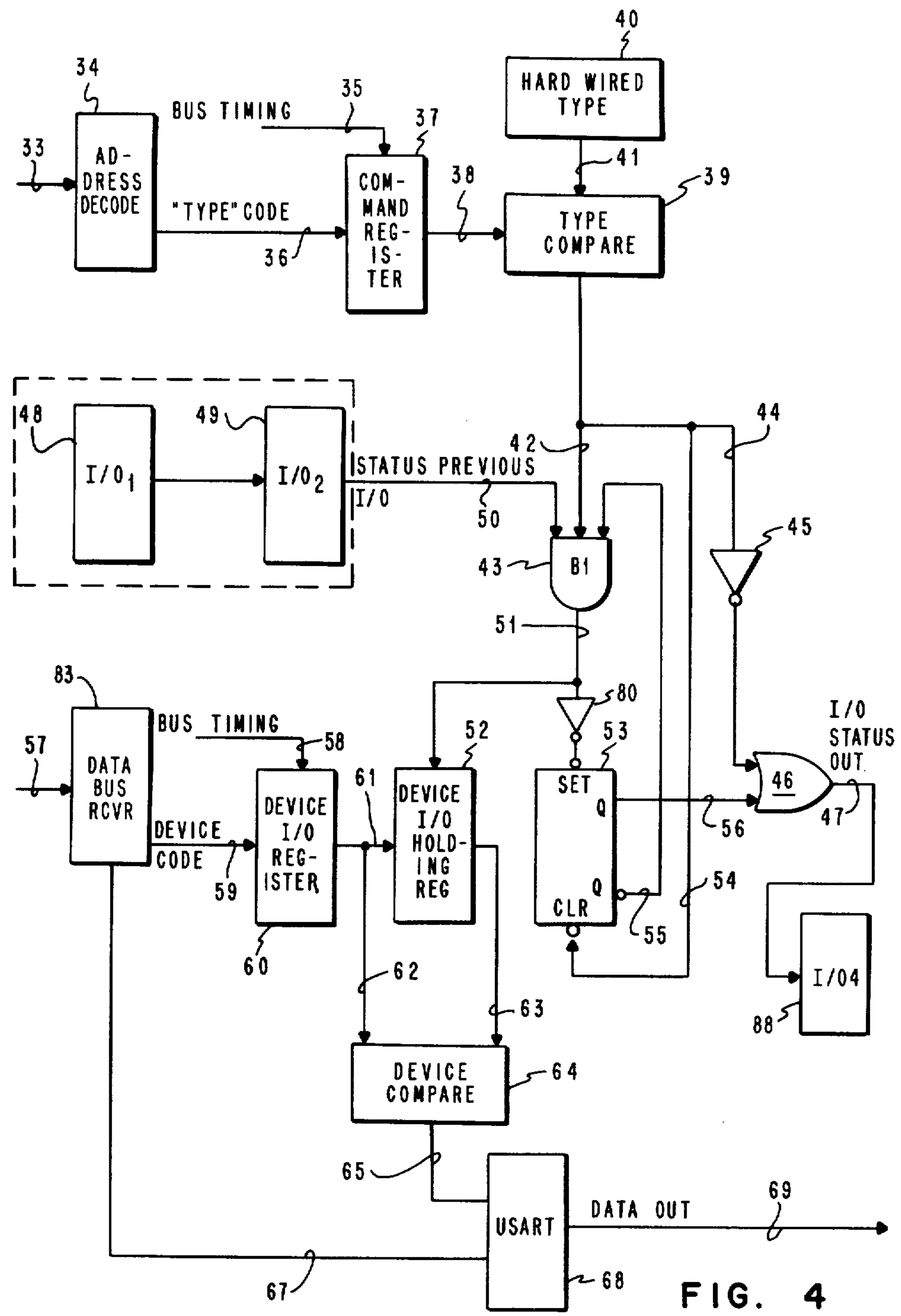
FIG. 4 shows a logic implementation in an I/O device for facilitating rapid assignment of identifiers to that device in accordance with the present invention.

For a more detailed description of examplary logic to be employed in I/O device in a system embodying the instant invention for allowing the processor to load I/O device identifiers refer to FIG. 4. FIG. 4 shows in detail the logic inside a given I/O device which may be device $I/O_3$ shown in FIG. 2. Address bus 33 is connected to the processor (not shown) and to address decoder 34. Address decoder provides a Type code on line 36 for temporary storage in command register 37 under control of bus timing signal placed on line 35 by the processor. Data from command register 37 is conveyed via line 38 to type comparator 39. The other input to the comparator 39 is along line 41 from a hardwired type source 40. Comparator 39 is provided to compare the Type code output from the processor with that hardwired in I/O device $I/O_3$. This hardwired type source may, for instance, be a dual inline switch setting or any type of easily actuatable switch. The hardwired type sources serves to identify the type of device, and in accordance with the present invention, is the only additional hardware requirement. It is this minimal hardware impact which enables device identification assignment to be achieved with great flexibility in systems employing my invention. A hardwired device type can be used to indicate whether a particular I/O device is a printer, disk drive, tape reader/recorder, etc. The output indicative of the result of the operation of comparator 39 is applied along line 42 to AND gate 43. The output of compare unit 39 is also applied along line 44 through inverter 45 to OR gate 46, as well as to the clear input of device status latch 53.

AND gate 43 receives another input along line 50 which indicates the status of previous devices. These devices need not be of the same type. These devices, $I/O_1$ and $I/O_2$, are indicated at 48 and 49. The line connecting devices 48 and 49 is the line 19 from FIG. 2 for passing the status between adjacent devices. The third input to AND gate 43 is the Q signal along line 55 from I/O device status latch 53. The output of AND gate 43 is applied along line 51 to device ID holding register 52 and to the set input of status latch 53 through inverter 80.

The I/O device identifier code is placed on data bus 57 by the processor. Data bus 57 is connected to data bus receivers 83 from which the device identifier code is loaded into device ID register 60 along line 59 under control of bus timing signals on line 58. The device identifier code is passed from device ID register 60 along line 61 to the device ID holding register 52. It is likewise applied along line 62 to device comparator 64. The output of device ID holding register 52 was likewise applied along line 63 to device compare 64 and the output of device compare 64 is applied along line 65 to USART 68 or universal synchronous/asynchronous receiver/transmitter device 68. The other input to device 68 is from the data bus receiver 83 along line 67 and results in data being output along line 69. Devices 64, 83, and 68 do not comprise part of the present invention, but instead, are merely shown for illustrative purposes as to how data is transmitted to and from the I/O device. The Q output of status latch 53 is applied along line 56 to OR gate 46.

An appreciation for the operation of a preferred embodiment of the instant invention may be gained still having reference to FIG. 4. In operation the processor outputs a device type along the address bus 33 and this type code is decoded in decoder 34 and applied along line 36 to command register 37. Under control of bus timing, the current type code is output from command register 37 and is applied along line 38 to compare unit 39 where it is compared with the type hardwired in the I/O device. If a compare is equal a high logical level appears on line 42 and is input to AND gate 43. As previously described, another input to AND gate 43 is along line 50. This input applied along line 50 is at a high logical level, as will be later apparent if the previous devices in the chain of devices represented by I/O devices 48 and 49, have been loaded with a device identifier. The other input to AND gate 43 is from the Q output of status latch 53.

Status latch 53 provides a high logical level on line 55 indicating that the device can accept a device identifier. When a compare is made in unit 39 a high logical level is applied along line 42 to the AND gate 43 and releases the clear input on status latch 53. It should be noted that each device status latch remains set so long as the correct "type" is latched in command register 37. Should a different type be output by the processor all non-matching device types result in a clear input to status latch 53. In other words, the output of comparator 39 goes low.

When the logical level on line 55 is high, the output of AND gate 43 on line 51 will be at a high logical level. This high logical level is inverted by inverter 80 before it is applied to the set input of status latch 53, thus causing it to set. Its setting causes a high logical level to be applied along line 56 to OR gate 46 and causes the output from OR gate 46 on line 47 to be at a high logical level indicating to lower priority devices that a type compare has been made and that an I/O identifier has been loaded into this particular I/O unit.

Subsequent to outputting the type along address bus 33 the processor outputs a device code along data bus 57. The device code is applied along line 59 and is gated under control of bus timing along line 58 into device ID register 60 where it is temporarily held. The output of device ID register 60, which is to be the assigned device code, is applied along line 61 to device ID holding register 52 when the output of AND gate 43 assumes a high logical level. The device identifier loaded into holding register 52 constitutes the device identifier by which the processor will address the device during subsequent information handling operations. The output from device ID register 60 is also applied along line 62 to device compare 64. Device compare 64 is operative to allow the processor to communicate with particular given I/O device during subsequent operations.

After loading of device ID holding register 52 has occurred, the processor may then communicate with the I/O device through conventional I/O procedures using only the device identifier. This device identifier is output by the processor onto data bus 57 through device ID register 60 along line 62 into device compare 64 where a comparison is made between the device ID holding register contents and the device ID register contents. If the comparison is equal, the indication thereof is applied along line 65 to USART 68. Communicated data from data bus 57 along line 67 is also input to the particular I/O device at the USART 68 and output via line 69. As previously stated, devices 64, 83, and 68 have nothing to do with the present invention and are included merely to illustrate how the I/O device functions to receive and transmit data.

Further, as previously described, once a device code has been assigned to a particular I/O device in accordance with the present invention, that device must then indicate to devices lower in the chain of devices such that any subsequent device identifier will be loaded into its next lower ordered I/O device. This occurs since the output on I/O status line 47 is at a high logical level due to the setting of status latch 53 when the conditions into AND gate 43 were met. Thus, it is the setting of latch 53 which signifies that the associated device identifier code has been loaded into register 52. This status then will be signaled to lower ordered devices, the first of which may be $I/O_4$ indicator at 88. Once the type changes and the status latch is cleared, a logical one to the lower ordered devices is supplied by the output of invertor 45, as a non-matching type results in a logical low at line 44.

In summary, a computer system having a CPU connected to I/O devices via a channel for setting addresses into the I/O devices by the CPU has been described. The I/O devices, for purposes of control, are grouped in types. To load device addresses or identifiers, the processor sends a type identifier to the I/O devices. The highest order device in terms of priority which does not have an assigned identifier responds by inhibiting all lower ordered devices of its type. It is then loaded with its unique assigned identifier which results in the setting of its status latch. This setting allows the next lowest ordered device to then be assigned and loaded with an identifier by the processor. This process continues until all I/O devices of the same type are loaded. The process is then repeated for each other type of I/O devices.

The novel technique thus eliminates the need for address jumpers which are employed in many device control units for fixing device addresses, thereby eliminating jumper pin costs and packaging problems. In addition, no manual intervention to set or change the device addresses is required. The system provides a high degree of flexibility in the assignment and reassignment of device addresses. Fast, error free processor controlled reconfiguration of the system is made possible with very little impact on internal processor programming.

While the invention has been shown and described with reference to particular embodiments thereof, it will be understood by those skilled in the art that the foregoing and other changes in form and detail may be made without departing from the spirit and scope of the invention.

What is claimed is:

1. In a computer system having a CPU connected to I/O devices via a channel for setting addresses into said I/O devices by said CPU, the improvement comprising:
   - identifying means in each I/O device for identifying itself to said CPU and adapted to be energized by said CPU,
   - means in said CPU for commanding said I/O devices simultaneously via said channel to prepare for receipt of an identifying address, and
   - means for selectively energizing least one of said identifying means in least one of said I/O devices and sending an address to that I/O device via said channel.

2. The computer system of claim 1 further including means for setting said addresses into said at least one of said I/O devices under program control.

3. The computer system of claim 2 further wherein said identifying means in each of said I/O devices further includes means for identifying the type of each said I/O device.

4. The computer system of claim 3 further including means for energizing by said CPU only said identifying means of said devices of a single type.

5. The computer system of claim 4 further incuding means for serially connecting each of said I/O devices of said single type.

6. The computer system of claim 5 further including means in said serial connection means for providing a priority scheme with an address to be set in one of said I/O devices being applied first to the highest ordered device in said serial connection.

7. The computer system of claim 6 further including means in said highest ordered device for setting in said assigned address and providing an output of said next lower ordered devices that it has been loaded with an address a thereby enabling the next address output from said CPU to said next lower ordered device.

8. The computer apparatus of claim 7 further including a memory in which said types and said I/O addresses are stored in table form.

9. The apparatus of claim 8 further wherein said means for providing an output to said next lower ordered device is a status latch which is set by a type compare means.

10. The computer system of claim 3 further including means in said CPU for sending said device types to all of said I/O devices, each of said I/O devices including a designated device type and a compare means wherein the device type sent by said CPU is compared with said designated device type to provide said identification.

11. The computer system of claim 10 further including means for energizing by said CPU only said devices of a single type.

12. The computer system of claim 11 further including means for serially connecting each of said I/O devices of a single type serially.

13. The computer system of claim 12 further including means in said serial connection means for providing a priority scheme with an address to be set in one of said I/O devices being applied first to the highest ordered device in said serial connection.

14. The computer system of claim 13 further including means in said highest ordered device for setting in said assigned address and providing an output to said next lower ordered devices that it has been loaded with an address thereby allowing the next address output from said CPU to be loaded into said next lower ordered device.

15. The computer system of claim 14 further including a memory in which said types and said I/O addresses are stored in table form.

16. The computer system of claim 15 further wherein said means for providing an output to said next lower ordered device is a status latch which is set by said type compare means.

17. In an information processing system including a processor, memory, and a plurality of peripheral input/output devices each having a hardwired type code, improved apparatus for dynamically assigning identifiers to those devices comprising:
   - means in said processor for determining a type code;
   - means for transmitting that type code to said plurality of peripheral devices;
   - means in each device for comparing the processor originated type code with that already in each device;
   - means including in said comparing means operable if said preceding compare is equal for receiving a device identifier code from said processor; and
   - means for holding said device identifier code in said I/O device whereby said processor may subsequently address a given device using only said device identifier code.

18. The apparatus of claim 17 further including means in each of said plurality of peripheral devices for indicating that the device has received a device identifier code.

* * * * *

UNITED STATES PATENT AND TRADEMARK OFFICE
CERTIFICATE OF CORRECTION

PATENT NO. : 4,360,870

DATED : November 23, 1982

INVENTOR(S) : J. M. McVey

It is certified that error appears in the above-identified patent and that said Letters Patent are hereby corrected as shown below:

Column 7, line 37, insert the word --at-- following "energizing".

line 38, insert the word --at-- following "in".

line 51, the word "incuding" should read --including--.

line 61, the word "of" should read --to--.

Column 8, line 1, delete the word "a".

line 12, the word "including" should read --includes--.

line 21, delete "serially".

line 52, the word "including" should read --included--.

Signed and Sealed this

*Twenty-ninth* Day of *March 1983*

[SEAL]

*Attest:*

GERALD J. MOSSINGHOFF

*Attesting Officer* *Commissioner of Patents and Trademarks*